J. G. CASTERAN.
JOINT FOR FLEXIBLE RAILS.
APPLICATION FILED MAR. 2, 1914.

1,130,145.

Patented Mar. 2, 1915.
2 SHEETS—SHEET 2.

Witnesses

Inventor
Juan Graciano Casteran,
by
Attorney.

UNITED STATES PATENT OFFICE.

JUAN GRACIANO CASTERAN, OF BUENOS AIRES, ARGENTINA.

JOINT FOR FLEXIBLE RAILS.

1,130,145.         Specification of Letters Patent.      Patented Mar. 2, 1915.

Application filed March 2, 1914. Serial No. 822,095.

*To all whom it may concern:*

Be it known that I, JUAN GRACIANO CASTERAN, citizen of Uruguay, and resident of Moreno street No. 782, Buenos Aires, Argentina, have invented certain new and useful Improvements in Joints for Flexible Rails, of which the following is a specification.

This invention has reference to the construction of flexible rails, conveyer chains, and the like, and it proposes certain hereinafter-described improvements in or relating to the formation of the joints between the successive links, or similar members, of which such devices are composed, the object being to avoid the use of the studs or pivot bolts by which the link ends are connected, together with the defects consequent upon their use.

To accomplish the object stated, the link ends are formed with interfitted or nested sleeves which are relatively movable, and which not only unite to constitute the bearing connections between the links, but also act as containers for the lubricant with which such connections are constantly supplied, whereby the employment of specially-constructed additional parts for lubricating purposes is rendered unnecessary, and the bulk of the device as a whole is correspondingly decreased, while at the same time the wear upon the afore-mentioned sleeves due to friction is reduced to a point where it is practically negligible.

An embodiment of the invention is illustrated in the accompanying drawing, whereof:—

Figure 1:
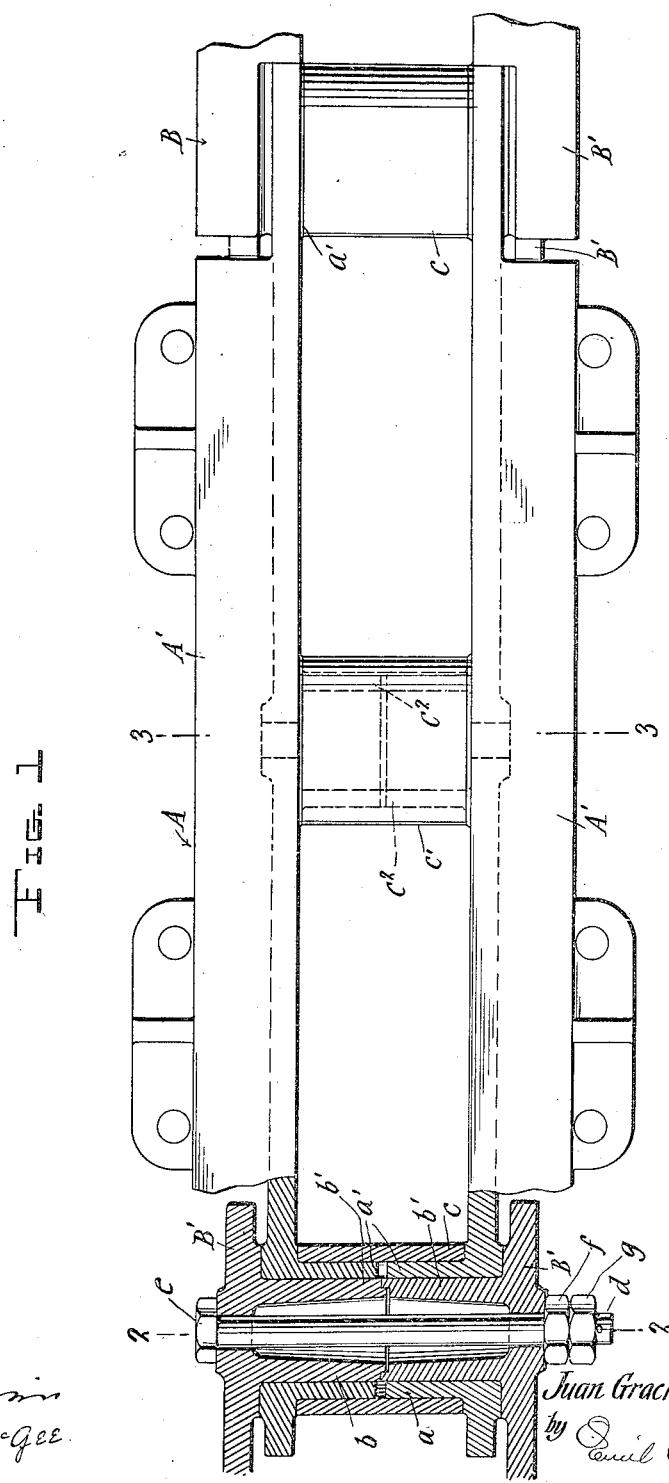
Figure 2:
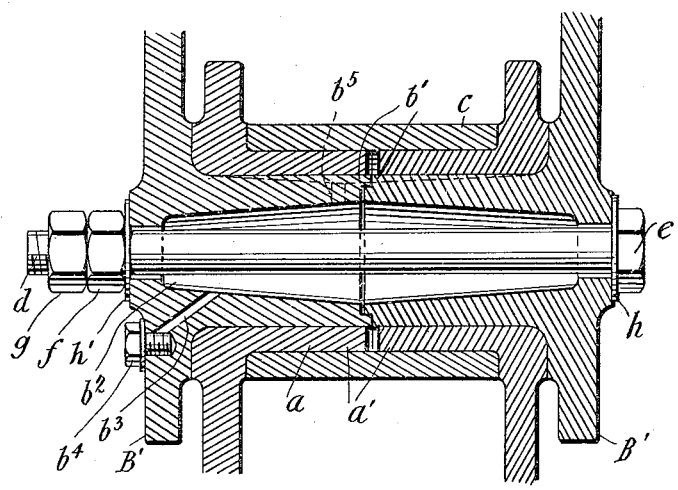
Figure 3:
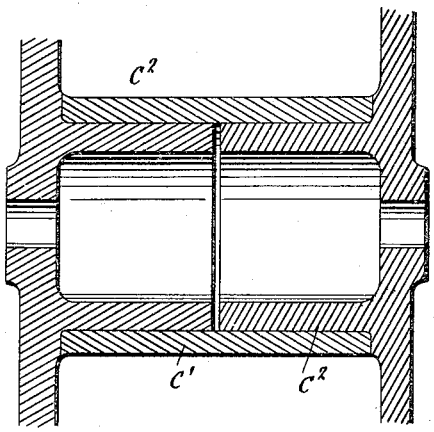

Figure 1 is a plan view, partly in section, showing the connections between successive links; and Figs. 2 and 3 are transverse sections taken, respectively, on the lines 2—2 and 3—3 of Fig. 1.

Referring to said drawing, A and B indicate, generally, the alternate links of a chain or flexible rail to be connected, and according to the present improved construction, these links are of skeleton formation and are composed, each, of a pair of substantially counterpart longitudinal sections or halves $A'$ $A'$ or $B'$ $B'$. At opposite ends, the links are provided with a pair of transverse cylindrical sleeves, those on the link A being designated by the reference letters $a$, $a$, and those on the links B by the letters $b$, $b$, the sleeves, in each instance, being made up of a pair of alining sections $a'$ $a'$ or $b'$ $b'$ formed one on one link section and the other on the other link section by reason of the particular construction of the links as above described.

To enable the connection between the sleeves on adjacent ends of the links to be effected, a sleeve on one end of one link is fitted loosely within the sleeve on the presented end of the next link, the sleeves being made of different diameters for this purpose. In the construction illustrated, the sleeves $a$ are disposed exteriorly of the sleeves $b$, and are, therefore, of greater diameter, but on the other hand they are shorter than the said sleeves $b$, as shown in Fig. 2, the side walls of the sections $B'$ of the links B being disposed a greater distance apart than those of the sections $A'$ of link A. The ends of the sections $A'$ thus fit between those of the sections $B'$, and to prevent lateral displacement thereof, as well as to reinforce the construction, the pairs of nested sleeves are joined by stay-bolts $d$ that are inserted through the inner sleeves $b$ and project at their ends through apertures in the sides of the link sections $B'$, at one of which points they are provided with heads $e$ and washers $h$, and at the other point with pairs of nuts $f$ and $g$ and washers $h'$.

The bore of each sleeve $b$ is enlarged in the manner depicted, in Fig. 2, so as to form a lubricant chamber $b^2$, into which the oil or the like is introduced through a duct $b^3$ in the corresponding link section $B'$, the ends of the chamber being closed by the washers $h$ and $h'$, and the duct by the screw-plug $b^4$. The lubricant contained in said chamber is permitted to escape therefrom to the outer sleeve $a$ by way of a suitably-located port or ports $b^5$, and in this way its free circulation through the bearing is insured, the entry of grit, dust or other foreign matter being completely avoided by the afore-mentioned washers.

While the construction above described is complete to all intents, it may be further improved by additionally reinforcing the links both at their point of connection with one another and at their centers, or at the former point only. To this end, each pair of nested sleeves may have associated with them a third steel sleeve $c$ which preferably encircles the outer sleeve $a$, being fitted while hot over the sections $a'$ of said sleeve and subsequently cooled by oil or water, so as to contract tightly therearound and thus provide a hard and lasting bearing surface that is particularly desirable where the device is to be used as a driving chain. The central or supplemental reinforcement, shown in Fig. 3, is similar in the main to that just described, and consists of a sleeve $c'$ fitted and shrunk around abutting sleeve sections $c^2$ formed integral with the link sections upon the inner faces thereof, this construction being designed primarily for use in instances where the links have more than one point of engagement with the sprocket wheels.

I claim as my invention:—

1. A multi-part, flexible device of the character specified comprising successive component members connected together at their mutually-adjacent ends by pairs of interfitted, inner and outer tubular elements which are formed integral with said members and are relatively rotatable, a reinforcing bearing sleeve shrunk tightly on each outer element, and each inner element having its interior enlarged centrally to constitute a lubricant chamber and provided with inlet and outlet openings leading to and from the same and a closure for each inlet opening.

2. A multi-part, flexible device of the character specified comprising successive component members connected together at their mutually-adjacent ends by pairs of interfitted, inner and outer tubular elements which are formed integral with said members and are relatively rotatable, each inner element having its interior enlarged centrally to constitute a lubricant chamber and provided with inlet and outlet openings leading to and from the same and a closure for each inlet opening.

Signed at Buenos Aires, this 13th day of January A. D. 1914.

JUAN GRACIANO CASTERAN.

Witnesses:
J. A. DE MARSA,
A. R. PERER.

Copies of this patent may be obtained for five cents each, by addressing the " Commissioner of Patents, Washington, D. C."